United States Patent [19]

Losada

[11] Patent Number: 5,525,018
[45] Date of Patent: Jun. 11, 1996

[54] FASTENER ASSEMBLY FOR USE WITH POWER ACTUATED GUN

[76] Inventor: Al Losada, 204 Folino Dr., Bridgeport, Conn. 06606

[21] Appl. No.: 393,866

[22] Filed: Feb. 24, 1995

Related U.S. Application Data

[62] Division of Ser. No. 48,493, Apr. 16, 1993, Pat. No. 5,417,534.

[51] Int. Cl.⁶ ................................................ F16B 15/00
[52] U.S. Cl. ................................................ 411/441
[58] Field of Search ................................. 411/440, 441, 411/462, 482, 923

[56] References Cited

U.S. PATENT DOCUMENTS

| | | |
|---|---|---|
| 2,961,210 | 11/1960 | Pfaff. |
| 2,968,984 | 1/1961 | De Caro ................................. 411/441 |
| 3,921,495 | 11/1975 | Braun. |
| 4,736,923 | 4/1988 | Losada. |
| 4,915,561 | 4/1990 | Buhri. |
| 5,178,503 | 1/1993 | Losada. |
| 5,261,770 | 11/1993 | Hoepker. |

FOREIGN PATENT DOCUMENTS 2504816  8/1975  Germany.

*Primary Examiner*—Flemming Saether
*Attorney, Agent, or Firm*—Fattibene and Fattibene; Paul A. Fattibene; Arthur T. Fattibene

[57] ABSTRACT

A power actuated fastener assembly for use with a power actuated gun having a broad bearing surface and a raised portion for holding a stud and raising the pointed end above the bearing surface. The raised portion or cone shape forms a gap that widens from the point of the shank to the bearing surface. This creates a stable fastener assembly and raises the pointed end of the stud at or near the bearing surface of the fastener assembly. The fastener assembly can be driven in a single step with a power actuated gun without the necessity of partially driving the fastener assembly into the structure being fastened into a masonry surface. Additionally, the raised portion or cone shaped portion automatically strips away or breaks the plastic fluting commonly associated with such fasteners and is often undesirable compressed under the head of such fasteners. Thereby, a safer, more efficient power actuated fastener is obtained.

9 Claims, 3 Drawing Sheets

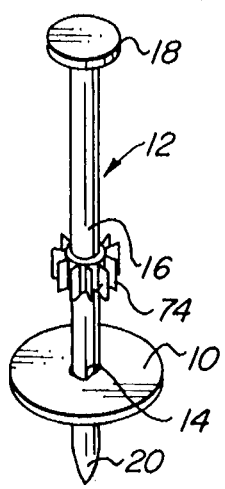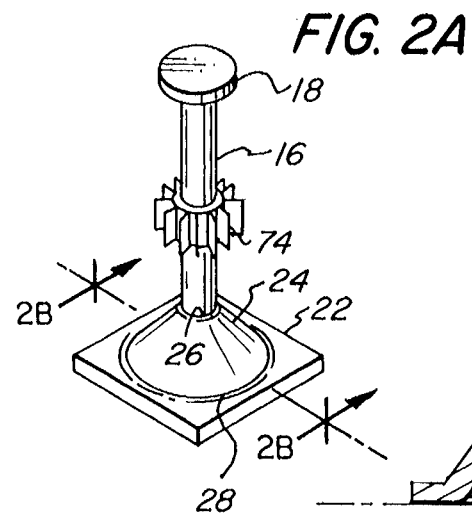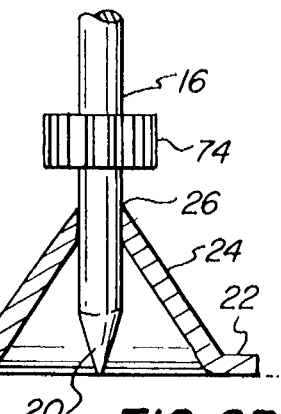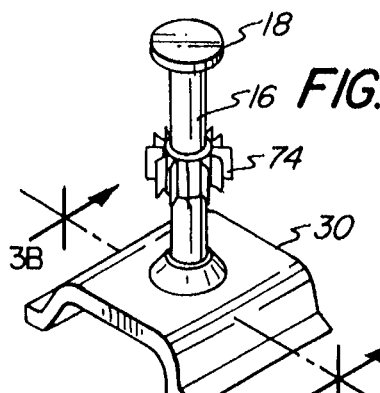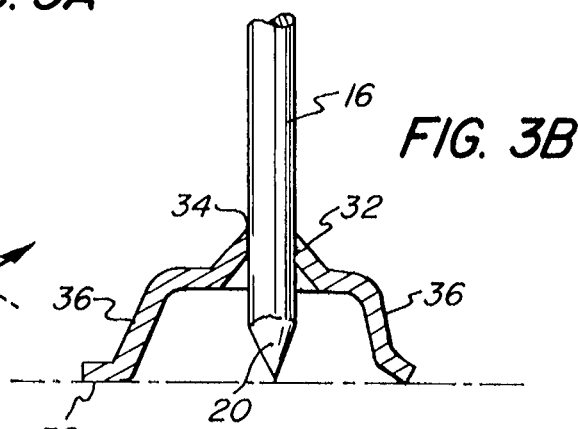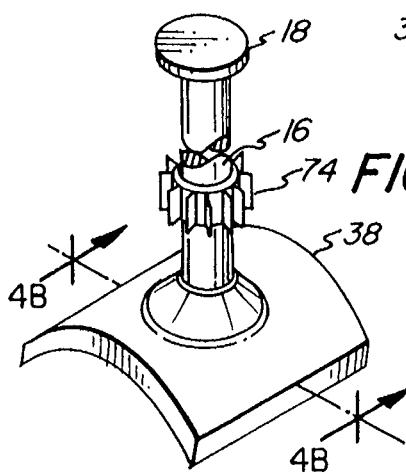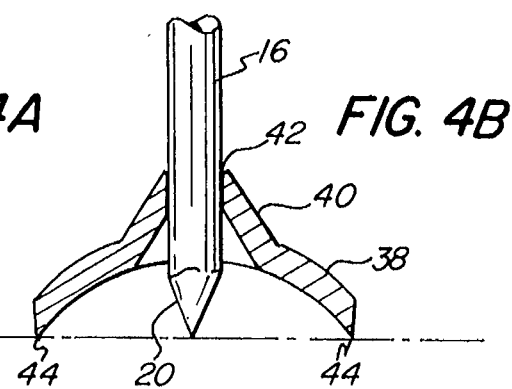

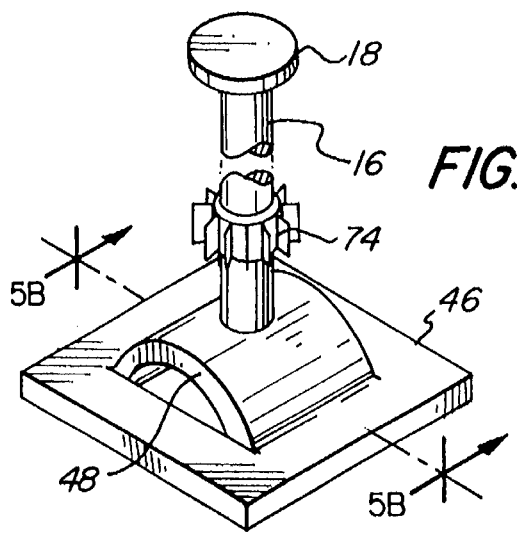
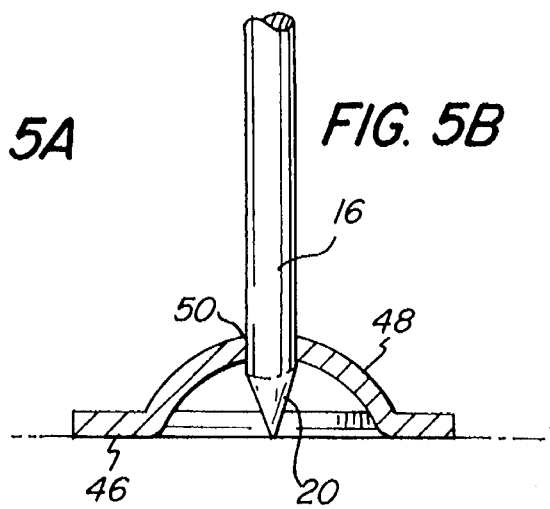
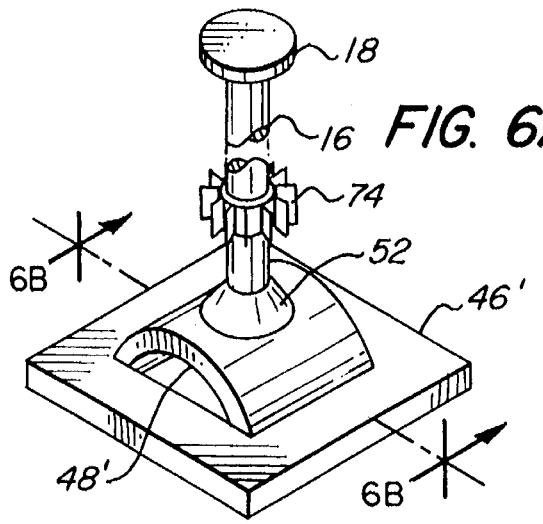
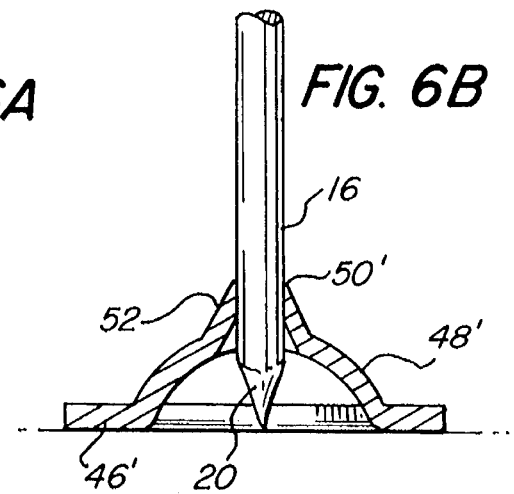
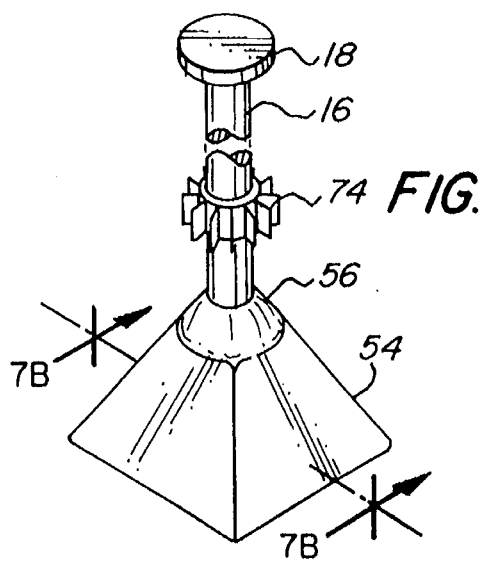
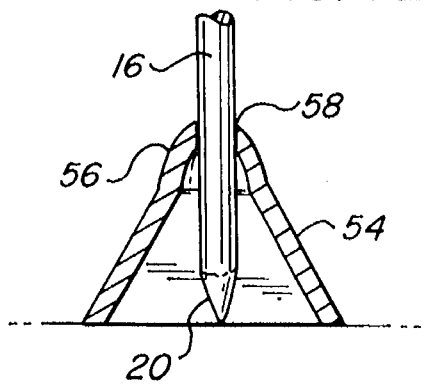

FASTENER ASSEMBLY FOR USE WITH POWER ACTUATED GUN

This application is a division of application Ser. No. 08/048,493, filed Apr. 16, 1993, now U.S. Pat. No. 5,417,534.

FIELD OF THE INVENTION

The present invention relates generally to mechanical fasteners for use in construction, and more specifically to fasteners for attaching construction materials to masonry type surfaces with a power actuated gun.

BACKGROUND OF THE INVENTION

There are many fasteners designed to be driven by a power actuated gun. These fasteners are used in construction for attaching wood, plastic, or steel structural members to masonry type surfaces such as stone, brick, or masonry walls. One such fastener is a round washer having a pointed stud placed therethrough and frictionally retained therein. The pointed end of the stud extends below the surface of the attached washer. Before driving this fastener assembly, the fastener assembly has to be conventionally nailed into the softer structural material such as wood, plastic or steel, that is being attached to the masonry surface. A power actuated gun is then used to fully drive the fastener assembly into the masonry surface. While this adequately holds the structural member to the masonry surface, the prior step of partially driving the fastener assembly into the structural member to be attached requires additional time and effort, slowing the construction process. Occasionally, in order to save time, the fastener assembly is driven in one step through the structural member and masonry surface with the power actuated gun without the prior step of conventionally driving the pointed end portion of the fastener assembly into the structural member up to the washer surface. While this saved time, it results in the potentially hazardous occurrence of the fastener assembly being shot in an unpredictable direction. The fastener assembly merely resting on the pointed end portion thereof easily tilts or rocks askew of the surface which, upon occasion, results in the fastener assembly being deflected by the surface and dangerously causing the fastener assembly to be shot in an unpredictable direction, having the potential to create serious injury.

Additionally, if driven successfully, the flat washer of the fastener assembly is often deformed causing the center portion of the washer to be driven into the structural member of the washer with the outer circumference turned up. This reduced the bearing surface of the fastener on the structural member. This results in the structural member being more easily pulled from the fastener. Additionally, the plastic flutes used to guide the stud in the barrel of a power actuated gun would often compress and deform between the head of the stud and the flat washer. This results in a space between the head and the flat washer which is undesirable for several reasons. One reason is that the head of the stud is raised above the surface, and another is that upon loosening or removal of the relatively soft plastic over time results in a gap between the washer and head, thereby resulting in play between the masonry surface and the structural member.

While these and other types of fasteners have proved useful in many applications, they are not without their inconveniences. Therefore, there is a need for an improved fastener assembly that is easy to use, more efficient, and safer.

SUMMARY OF THE INVENTION

The present invention comprises a fastener assembly having a plate with a raised surface thereon. At the center of the raised surface is an aperture. Through the aperture a stud is frictionally retained therein. The pointed end of the stud does not extend substantially below the lower bearing surface of the plate. The raised portion above the bearing surface permits the fastener assembly to be securely placed on a surface through which the stud is to be driven. Additionally, a cone shaped portion of the raised surface facilitates a plastic flute used on the stud as a guide when placed in the barrel of a power actuated gun to break free from the fastener assembly upon being driven into the masonry surface. After being driven, the fastener assembly is deformed, creating a broad bearing surface on the structural member being fastened to the masonry surface.

Accordingly, it is an object of the present invention to provide a fastener assembly that is easy to use and efficient.

It is another object of the present invention to provide a safer fastener.

It is an advantage of the present invention that it does not have to be partially driven into a work surface or structural member before being driven by a power actuated gun.

It is an advantage of the present invention that it is made from a square piece of metal.

It is a further advantage of the present invention that a broad stable bearing surface is provided.

It is a feature of the present invention that a raised portion is provided above the initial bearing surface.

It is a further feature of the present invention that the pointed end of the stud does not extend substantially below the initial bearing surface.

These and other objects, advantages, and features will become readily apparent in view of the following more detailed description.

BRIEF DESCRIPTION OF THE DRAWINGS

FIG. 1 is a perspective view of a prior art fastener assembly.

FIG. 2A is a perspective view of one embodiment of the present invention.

FIG. 2B is a partial cross section taken along line 2B—2B in FIG. 2A.

FIG. 3A is another embodiment of the present invention.

FIG. 3B is a partial cross section taken along line 3B—3B in FIG. 3A.

FIG. 4A is another embodiment of the present invention.

FIG. 4B is a partial cross section taken along line 4B—4B in FIG. 4A.

FIG. 5A is another embodiment of the present invention.

FIG. 5B is a partial cross section taken along line 5B—5B in FIG. 5A.

FIG. 6A is another embodiment of the present invention.

FIG. 6B is a partial cross section taken along line 6B—6B in FIG. 6A.

FIG. 7A is another embodiment of the present invention.

FIG. 7B is a partial cross section taken along line 7B—7B in FIG. 7A.

DETAILED DESCRIPTION OF THE PREFERRED EMBODIMENT

Figure 8A:
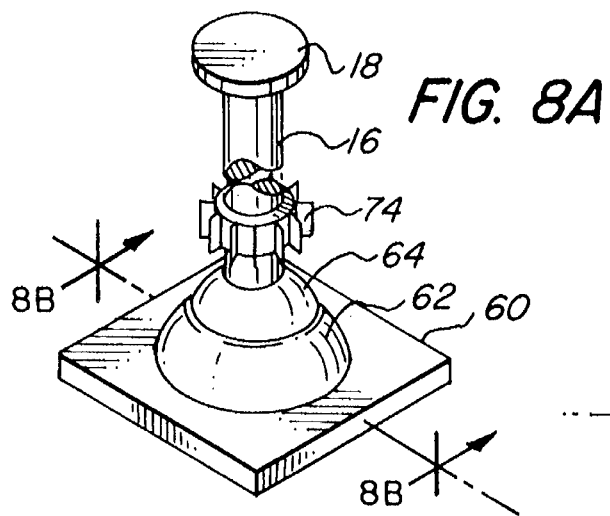
FIG. 8A is another embodiment of the present invention.

FIG. 1 illustrates a prior art fastener assembly comprising a round washer 10 having an aperture 14 therein. A stud 12 having a shank 16, a head 18, and a tapered or pointed end 20 is frictionally retained within aperture 14. Circumscribing the shank 16 is a ribbed plastic flute 74 that is used to guide the fastener assembly within the barrel of a power actuated gun. The present invention is similar to the fastener assembly disclosed in U.S. Pat. No. 5,110,247 entitled FASTENER ASSEMBLY WITH RETAINING FINGERS FOR USE WITH A POWER ACTUATED GUN, issuing to the inventor in the present application on May 5, 1992, which is herein incorporated by reference.

FIGS. 2A–B illustrate one embodiment of the present invention. Referring to FIGS. 2A–B, a square plate 22 has a raised circular portion or cone 24 thereon. The use of a square plate 22 is advantageous because it can be cut from a strip of metal. This prevents wasted material as is encountered by stamping a round washer out of a sheet of metal, which is the current practice. At the apex of the raised portion 24 is an aperture 26. Aperture 26 is of a size to frictionally receive shank 16. Between the base 28 of the raised portion 24 and the edges of plate 22 is an initial bearing surface which is used to contact the structural member, not shown, that is to be fastened to a masonry surface. The structural members typically take the form of lumber used in erecting petitions, plastic or steel supports used in construction, or any other construction materials needed to be affixed to masonry floors, walls, or ceilings. As can be more clearly seen in FIG. 2B, the pointed end 20 of the shank 16 extends through aperture 26 and is positioned slightly above or slightly below a plane formed by the initial bearing surface adjacent the structural member to be attached. Between the outer diameter of shank 16 and the interior sides of the raised or cone shaped portion 24 is a gap that extends from the aperture 26 to the initial bearing surface of plate 22. This gap widens from the aperture 26 to the bearing surface of plate 22. This results in a very stable fastener assembly that can be power driven with a power actuated gun without the need of partially driving the fastener assembly into the structural member being fastened to the masonry surface. Additionally, after being driven, the raised portion or cone 24 of plate 22 deforms to provide a large, flat bearing surface area, contributing to the holding power of the fastener assembly. The raised portion or cone 24 additionally serves to strip or break away the plastic flute 74 from the fastener assembly after being driven. The plastic flute 74 is used merely to guide the fastener assembly within the barrel of a power actuated gun.

FIG. 3A–3B is another embodiment of the present invention. With reference to FIGS. 3A–B, plate 30 has a raised central portion or cone 32 and two legs 36. Shank 16 is frictionally held within aperture 34. This embodiment has the advantage that plate 30 can be cut from an extruded channel, simplifying manufacture. Additionally, the raised portion or cone 32 does not have to be drawn as deeply as the raised portion 24 illustrated in FIGS. 2A–B. Cone 40 forms a gap between the outer diameter of the shank 16 and the inner surface of a portion of plate 30. This gap widens for from the aperture 34 to the pointed end 20 of shaft 16. Plate 30 forms substantially half of a polygon in cross section.

FIGS. 4A–4B illustrate yet another embodiment of the present invention. With reference to FIGS. 4A–B, therein illustrated is a substantially continuously curved plate 38. Curved plate 38 has a central portion or cone 40 therein. The central portion or cone 40 has an aperture 42 at its apex. The aperture 42 is adapted or sized so as to frictionally retain the shank 16. On either end of substantially continuously curved plate 38 is a foot 44. Feet 44 are relatively sharp and help prevent the plate 38 from sliding prior to the shank 16 being driven into the structural support being fastened to the masonry surface.

FIGS. 5A–5B illustrate a further embodiment of the present invention. Referring to FIGS. 5A–B, a raised portion 48 is cut and stamped from plate 46. The raised portion 48 is partially cylindrical in shape. In the top surface of the partially cylindrical raised portion 48 is an aperture 50. Aperture 50 is adapted to frictionally retain the shank 16. The partially cylindrical raised portion 48 must be sufficiently high from the initial bearing surface of the plate 46 to securely hold the outer diameter of shank 16 while the pointed end portion 20 of shank 16 is held substantially at the plane formed by the initial bearing surface of plate 46. Upon being driven, the partially cylindrical raised portion 48 collapses forming a broad flat bearing surface that helps securely hold the structural member being attached to the masonry surface.

FIGS. 6A–6B illustrates yet another embodiment of the present invention. With reference to FIGS. 6A–B, plate 46' has a raised partially cylindrical surface 48' thereon, similar to that illustrated in FIGS. 5A–B. The raised partially cylindrical surface 48' has a substantially semicircular cross section. However, at the top-most surface of the partial cylindrical raised portion 48' is a second raised portion or cone 52. At the apex of cone 52 is an aperture 50'. The aperture 50' is sized to frictionally receive and hold the shank 16. Cone 52 helps increase the height of the portion of the bracket 46' holding the shank 16 above the plane formed by the initial bearing surface of plate 46'. This assures that the portion of the shank 16 being held is of a constant diameter and is not affected by the tapered or pointed end 20. Additionally, the cone 52 helps to more securely hold the shank 16, as well as provide more stability in holding the fastener assembly vertical, while exerting pressure on the power actuated gun just prior to firing and driving the shank with great force into the structural support and masonry surface. In order for most power actuated guns to fire, for safety reasons, the barrel must be pressed in with some force before it will fire. Therefore, it is critical that the fastener assembly be stable to prevent slipping or rocking of the assembly before firing. The shaft of the fastener assembly should be vertical with respect to the surface being fired into.

FIGS. 7A–7B illustrates yet another embodiment of the present invention. With reference to FIGS. 7A–B, a pyramid shaped support plate 54 is illustrated. Plate 54 has a cone 56 formed at the apex thereof. Within the cone 56 is formed an aperture 58. Aperture 58 has a size sufficient to frictionally retain the shaft 16. This embodiment has the advantage of holding the shaft 16 high up above the bearing surface of plate 54, creating more stability.

Figure 8B:
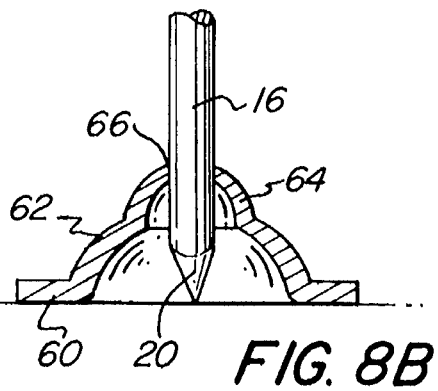
FIG. 8B is a partial cross section taken along line 8B—8B in FIG. 8A.

FIGS. 8A–8B illustrate yet a further embodiment of the present invention. Referring to FIGS. 8A–B, a plate 60 has a first raised portion 62 formed thereon. At the top of first raised portion 62 is a second raised portion 64. First raised portion 62 and second raised portion 64 are substantially hemispherical in shape. The second raised portion 64 being smaller than the first raised portion 62. Within the top surface of second raised portion 64 is an aperture 66. Aperture 66 is adapted to frictionally receive the shaft 16. The first and second raised portions 62 and 64 helps to yet further increase the distance from the initial bearing surface of plate 60 and the aperture 66 where the shaft 16 is held. This increases stability. Additionally, the first and second raised portions 62 and 64 may be accomplished in two separate operations with less force than may be required if the metal material of plate 60 had been drawn in a single operation.

Figure 9A:
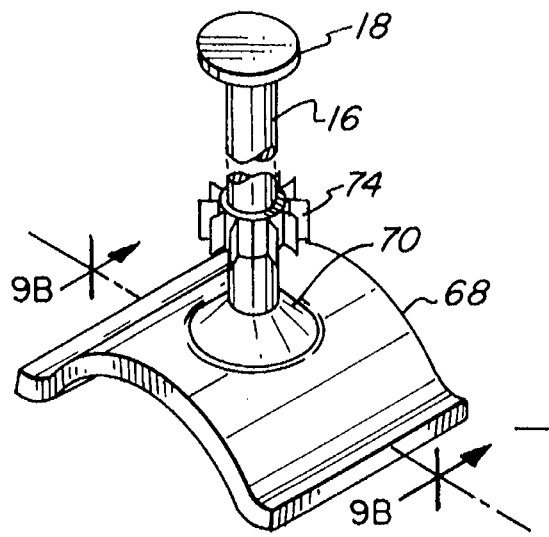
FIG. 9A is another embodiment of the present invention.
Figure 9B:
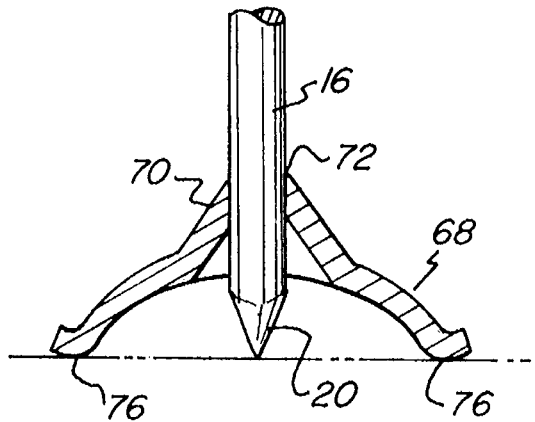
FIG. 9B is a partial cross section taken along line 9B—9B in FIG. 9A.

FIGS. 9A–9B illustrated a final embodiment of the present invention. Referring to FIGS. 9A–B, a curved plate 68 has a substantially continuous curve with bearing feet 76 at the ends thereof. At the top surface of curved plate 68 is a cone 70. At the apex of cone 70 is an aperture 72 therein. Aperture 72 is adapted to frictionally receive shaft 16. The embodiment illustrated in FIGS. 9A–B is similar to that illustrated in FIGS. 4A–B of the present invention, with the exception that the embodiment illustrated in FIGS. 9A–B have bearing feet 76 thereon. The bearing feet 76 may be advantageous when used with softer structural member materials.

While many different embodiments have been illustrated and described, it should be appreciated that the present invention provides a power actuated fastener assembly that has a raised portion or a cone shape that creates a gap which becomes wider from the portion holding the shank to the tapered tip of the shank. This provides advantages over the prior art fastening devices. Therefore, it should be appreciated by those skilled in the art that various modifications may be made without departing from the spirit and scope of this invention.

What is claimed is:

1. A fastener assembly of a type which is driven into a support structure by a power actuated gun comprising:

a plate, said plate having a central portion and an initial bearing surface in a first plane;

a first raised portion formed from the central portion of said plate, said first raised portion extending from said plate forming first support sides, said first raised portion having a cross section taken in a plane perpendicular to said plate that is substantially semi-circular;

a second raised portion formed on top of said first raised portion, said second raised portion extending from said first raised portion forming second support sides and having an aperture therein; and a stud having a head end portion, a shank, and a pointed end portion, said shank having a diameter to frictionally fit within the aperture, the first and second support sides and the shank forming a gap extending from the aperture and widening to the first plane, the pointed end portion of said stud positioned between the aperture and the first plane so that the pointed end portion does not extend below the first plane.

2. A fastener assembly as in claim 1 wherein:

said second raised portion is smaller that said first raised portion.

3. A fastener assembly as in claim 1 wherein:

said plate is rectangular.

4. A fastener assembly as in claim 1 further comprising:

a flute circumscribing the shaft of said stud.

5. A fastener assembly of a type which is driven into a support structure by a power actuated gun comprising:

a plate, said plate having a central portion and an initial bearing surface in a first plane;

a first raised portion formed from the central portion of said plate, said first raised portion extending from said plate forming first support sides;

a second raised portion formed on top of said first raised portion, said second raised portion extending from said first raised portion forming second support sides and having an aperture therein, said first and second raised portions being substantially hemispherical in shape; and a stud having a head end portion, a shank, and a pointed end portion, said shank having a diameter to frictionally fit within the aperture, the first and second support sides and the shank forming a gap extending from the aperture and widening to the first plane, the pointed end portion of said stud positioned between the aperture and the first plane so that the pointed end portion does not extend below the first plane.

6. A fastener assembly as in claim 5 wherein:

said second raised portion is smaller that said first raised portion.

7. A fastener assembly as in claim 5 wherein:

said plate is rectangular.

8. A fastener assembly as in claim 5 further comprising:

flute circumscribing the shaft of said stud.

9. A fastener assembly of a type which is driven into a support structure by a power actuated gun comprising:

a plate, said plate having a central portion and an initial bearing surface in a first plane;

a first substantially hemispherical raised portion formed from the central portion of said plate, said first raised portion extending from said plate forming first support sides;

a second raised portion formed on top of said first raised portion, said second raised portion extending from said first raised portion forming second support sides and having an aperture therein; and a stud having a head end portion, a shank, and a pointed end portion, said shank having a diameter to frictionally fit within the aperture, the first and second support sides and the shank forming a gap extending from the aperture and widening to the first plane, the pointed end portion of said stud positioned between the aperture and the first plane so that the pointed end portion does not extend below the first plane.

* * * * *